US008855321B2

(12) United States Patent
Park

(10) Patent No.: US 8,855,321 B2
(45) Date of Patent: Oct. 7, 2014

(54) METHOD FOR PROCESSING AUDIO SIGNAL AND BROADCASTING OUTPUT APPARATUS USING THE SAME

(75) Inventor: Jong-pill Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 12/554,040

(22) Filed: Sep. 4, 2009

(65) Prior Publication Data

US 2010/0111322 A1    May 6, 2010

(30) Foreign Application Priority Data

Nov. 6, 2008   (KR) ........................ 10-2008-0110136

(51) Int. Cl.
*H04R 5/00*         (2006.01)
*H04N 21/2368*      (2011.01)
*H04H 20/22*        (2008.01)
*H04N 5/60*         (2006.01)
*H04N 21/485*       (2011.01)
*H04N 21/475*       (2011.01)
*H04N 21/434*       (2011.01)
*H04H 20/95*        (2008.01)
*H04H 20/26*        (2008.01)
*H04H 40/27*        (2008.01)

(52) U.S. Cl.
CPC .............. *H04N 5/60* (2013.01); *H04N 21/2368* (2013.01); *H04H 20/22* (2013.01); *H04N 5/602* (2013.01); *H04N 21/4856* (2013.01); *H04N 21/4755* (2013.01); *H04N 21/4341* (2013.01); *H04H 20/95* (2013.01); *H04H 20/26* (2013.01); *H04H 40/27* (2013.01)
USPC ................. 381/22; 381/81; 381/123; 381/77; 381/23; 700/94; 348/462; 348/423.1

(58) Field of Classification Search
USPC ........... 381/77, 80, 81, 85, 86, 123, 7, 11, 14, 381/16, 22, 23, 61, 333, 94.4, 94.1; 368/211, 68; 370/474, 469, 522, 535; 348/231.4, 423.1, 462, 512, 515, 348/211.5, 726, 738, 724, E5.125, E5.122, 348/E5.123; 380/200; 700/94; 386/284, 386/285, E9.01, 338, 248
See application file for complete search history.

(56) References Cited

U.S. PATENT DOCUMENTS 5,754,940 A * 5/1998 Smith et al. .................... 725/100
6,119,091 A * 9/2000 Huang et al. .................. 704/500
(Continued)

FOREIGN PATENT DOCUMENTS

| EP | 0626786 A1 | 11/1994 |
| EP | 0952578 A2 | 10/1999 |
| EP | 1343162 A2 | 9/2002 |

(Continued)

OTHER PUBLICATIONS

Extended European search report dated Apr. 20, 2010, issued in counterpart European Application No. 09169784.7-2202.

*Primary Examiner* — Leshui Zhang
(74) *Attorney, Agent, or Firm* — Sughrue Mion, PLLC

(57) ABSTRACT

An audio signal processing method and a broadcasting output apparatus using the audio signal processing method are provided. The audio signal processing method includes selecting an audio signal to be processed from among a plurality of audio signals in which the same audio data is compressed in different formats, when the plurality of audio signals are received; and processing the selected audio signal. Therefore, it is possible to select a high quality audio signal from among audio signals compressed in various audio formats and to provide a user with the high quality sound.

22 Claims, 3 Drawing Sheets

(56) References Cited

U.S. PATENT DOCUMENTS

| | | | |
|---|---|---|---|
| 6,611,655 B1* | 8/2003 | Murase et al. | 386/338 |
| 6,965,727 B1* | 11/2005 | Sawabe et al. | 386/248 |
| 2002/0176028 A1* | 11/2002 | Yamamoto et al. | 348/738 |
| 2006/0262651 A1* | 11/2006 | Cooper et al. | 368/68 |
| 2008/0244652 A1* | 10/2008 | Nakano | 725/40 |

FOREIGN PATENT DOCUMENTS

| | | |
|---|---|---|
| KR | 10-2001-0009393 A | 2/2001 |
| KR | 10-2007-0091488 A | 9/2007 |

* cited by examiner

FIG. 2

| Settings for language and format of audio signal | | |
|---|---|---|
| Language | ▼ French | } A |
| Priority for audio formats | 1  ▼ HE-AAC | |
| | 2  ▼ AC3+ | } B |
| | 3  ▼ AC3 | |
| | 4  ▼ MPEG | | ns
METHOD FOR PROCESSING AUDIO SIGNAL AND BROADCASTING OUTPUT APPARATUS USING THE SAME

CROSS-REFERENCE TO RELATED APPLICATIONS

This application claims priority from Korean Patent Application No. 10-2008-0110136, filed on Nov. 6, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to an audio signal processing method and a broadcasting output apparatus using the method, and more particularly, to an audio signal processing method in order to provide a user with an audio signal appropriately selected from among audio signals in various languages and formats, and a broadcasting output apparatus using the method.

2. Description of the Related Art

Video formats have developed in, for example, Moving Picture Experts Group-1 (MPEG-1), MPEG-2 secure digital (SD), MPEG-2 high definition (HD) and H.264 formats. Audio formats have also developed in, for example, MPEG, Dolby digital (Ac3), Dolby digital plus (Ac3+), advanced audio coding (AAC) and high efficiency (HE)-AAC formats.

Development of video and audio formats enabled improvement of video and audio quality. Nevertheless, if a television (TV) system for reproducing video and audio is unable to support the enhanced video and audio formats, it is impossible to provide users with broadcasting having high quality.

As digital television broadcasting come into wide use, recent TV systems are being developed to support various video and audio formats so as to provide broadcasting having high image quality and audio quality.

Additionally, broadcasting stations mix various languages and audio formats, and send the mixed languages and formats via a single channel in order to provide users with enhanced services. Accordingly, it is possible for a TV system to select a format which it can support from among the various formats and provide it to the user.

Generally, after a tuner of a TV system receives a broadcast signal comprising video and audio signals, a video decoder may decode the video signal such as an MPEG video signal or an H.264 video signal, and an audio digital signal processor (DSP) may decode the audio signal, such as an MPEG audio signal, an Ac3 audio signal, an Ac3+ audio signal, an AAC audio signal and an HE-AAC audio signal, so that the decoded video and audio signals may be output.

Subsequently, a display apparatus plays the video signal decoded by the video decoder and the audio signal decoded by the audio DSP. In this situation, if only a single video signal and a single audio signal are transmitted via a single channel, there is no problem because the video decoder and audio DSP decode the video signal and audio signal, respectively.

However, if a broadcasting station mixes various languages and audio formats and sends the mixed languages and formats via a single channel, the TV system needs to select one from among the formats and provide a user with high quality broadcasting services.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an audio signal processing method in which priorities for a plurality of audio formats is set and an audio required by a user is processed using one selected from among various audio formats provided by a single channel, and a broadcasting output apparatus using the audio signal processing method.

According to an aspect of the present invention, there is provided an audio signal processing method comprising selecting an audio signal to be processed from among a plurality of audio signals in which the same audio data is compressed in different formats, when the plurality of audio signals are received; and processing the selected audio signal.

The audio signal processing method may further comprise setting priorities for a plurality of audio formats that include the different formats. The selecting may comprise selecting an audio signal of one of the plurality of audio formats arranged according to the set priorities among the plurality of received audio signals.

The audio signal processing method may further comprise setting a language to be applied when outputting the plurality of received audio signals.

The selecting may comprise selecting one or more audio signals generated in the set language among the plurality of audio signals; and selecting the audio signal of an audio format with the highest priority among the selected one or more audio signals.

The processing may comprise decoding the selected audio signal; and outputting the decoded audio signal.

The audio signal processing method may further comprise receiving a broadcast signal; separating the broadcast signal into a video signal and an audio signal; and processing the separated video signal.

According to another aspect of the present invention, there is provided a broadcasting output apparatus comprising a tuner which receives a broadcast signal; a selection unit which selects an audio signal to be processed from among a plurality of audio signals, which are contained in the received broadcast signal and in which the same audio data is compressed in different formats; and an audio processor which processes the selected audio signal.

The broadcasting output apparatus may further comprise a storage unit which stores priorities set for a plurality of audio formats that include the different formats. The selection unit may select an audio signal of one of the plurality of audio formats arranged according to the set priorities among the plurality of audio signals.

The storage unit may further store a language to be applied to output when outputting the plurality of audio signals.

The selection unit may select one or more audio signals generated in the set language among the plurality of audio signals, and select the audio signal of an audio format with the highest priority among the selected one or more audio signals.

The audio processor may comprise an audio decoder which decodes the selected audio signal; and an audio output unit which outputs the decoded audio signal.

The broadcasting output apparatus may further comprise a demultiplexer which separates the received broadcast signal into a video signal and an audio signal; and a video processor which processes the separated video signal.

BRIEF DESCRIPTION OF THE DRAWINGS

The above and/or other aspects of the present invention will be more apparent by describing certain exemplary embodiments of the present invention with reference to the accompanying drawings, in which:

FIG. 2 exemplary illustrates a user interface for setting a language and format of an audio signal output from the broadcasting output apparatus of FIG. 1, according to an exemplary embodiment of the present invention.

DETAILED DESCRIPTION OF EXEMPLARY EMBODIMENTS

Figure 1:
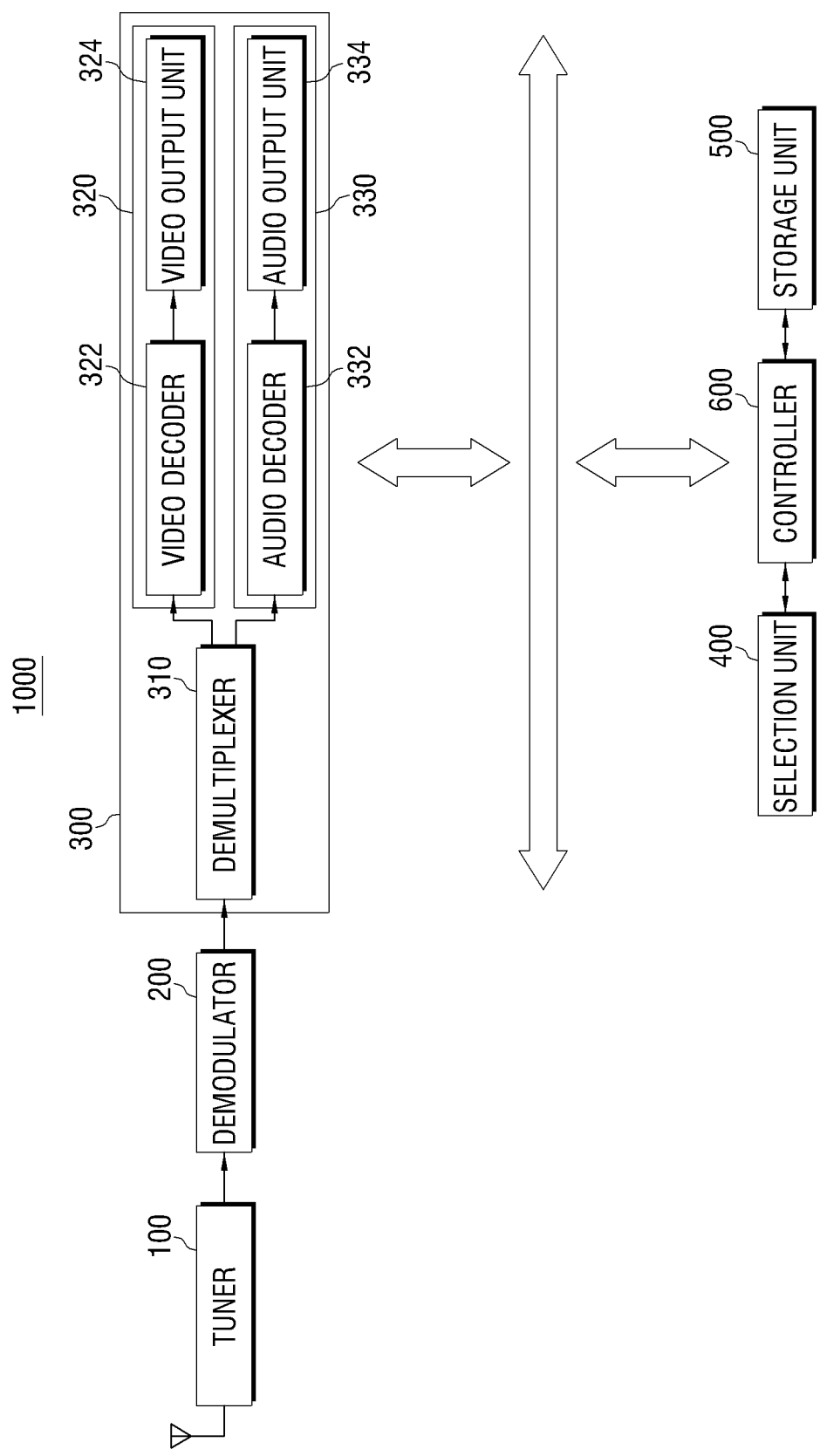
FIG. 1 is a block diagram of a broadcasting output apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a broadcasting output apparatus 1000 according to an exemplary embodiment of the present invention.

The broadcasting output apparatus 1000 of FIG. 1 comprises a tuner 100, a demodulator 200, an audio/video (A/V) signal processor 300, a selection unit 400, a storage unit 500 and a controller 600. The broadcasting output apparatus 1000 may be an apparatus capable of outputting a broadcast signal comprising video and audio signals, for example a digital television (DTV) and Internet Protocol TV (IPTV).

The tuner 100 receives a broadcast signal from a broadcast transmitter (not shown) via an antenna. The tuner 100 may receive a broadcast signal corresponding to a channel selected by a user.

The demodulator 200 demodulates the broadcast signal received by the tuner 100. In more detail, the broadcast transmitter modulates the broadcast signal and sends the modulated broadcast signal to the demodulator 200, and the demodulator 200 then demodulates the modulated broadcast signal.

The A/V signal processor 300 processes video and audio signals contained in the broadcast signal. The A/V signal processor 300 comprises a demultiplexer 310, a video processor 320 and an audio processor 330.

The demultiplexer 310 demultiplexes the broadcast signal received from the demodulator 200 to the A/V signal processor 300, so that the broadcast signal is separated into a video signal and an audio signal and that the separated video signal and audio signal are transmitted to the video processor 320 and the audio processor 330, respectively.

The video processor 320 receives the video signal from the demultiplexer 310 and processes the received video signal. The video processor 320 comprises a video decoder 322 and a video output unit 324.

The video decoder 322 decodes the video signal. The decoding operation performed by the video decoder 322 is the reverse of an encoding operation by which the broadcast transmitter encodes the video signal.

In this situation, the video signal compressed in a single video format among video formats, such as Moving Picture Experts Group-1 (MPEG-1), MPEG-2 secure digital (SD), MPEG-2 high definition (HD) and H.264 formats, is received from the broadcast transmitter to the broadcasting output apparatus 1000, and accordingly the video decoder 322 decodes the received video signal using the video format used by the broadcast transmitter. In other words, the known video format is used in both the encoding operation performed by the broadcast transmitter and the decoding operation performed by the broadcasting output apparatus 1000.

The video output unit 324 outputs the video signal decoded by the video decoder 322. The video output unit 324 may be a liquid crystal display (LCD) panel or a plasma display panel (PDP).

The audio processor 330 receives the audio signal from the demultiplexer 310 and processes the received audio signal. The audio processor 330 comprises an audio decoder 332 and an audio output unit 334.

The audio decoder 332 decodes the audio signal. The decoding operation performed by the audio decoder 332 is the reverse of an encoding operation by which the broadcast transmitter encodes the audio signal.

In this situation, the broadcasting output apparatus 1000 receives the audio signal compressed in one or more audio formats among audio formats, such as MPEG, Dolby digital (Ac3), Dolby digital plus (Ac3+), advanced audio coding (AAC) and high efficiency (HE)-AAC formats, from the broadcast transmitter.

Here, the video signal may be compressed in a single preset format among various video formats, whereas the audio signal may be compressed in one or more formats among various audio formats. Accordingly, the video decoder 322 may decode the video signal using the preset format only, but the audio decoder 332 may decode all audio signals using various audio formats.

In an exemplary embodiment of the present invention, the audio decoder 332 decodes the audio signal of one of audio formats arranged according to a preset priority among a plurality of audio signals. The audio signal decoded by the audio decoder 332 may be selected by the selection unit 400 that will be described later.

The audio output unit 334 outputs the audio signal decoded by the audio decoder 332. The audio output unit 334 may be a speaker.

In response to a plurality of audio signals in which the same audio data is compressed in different formats, the selection unit 400 selects an audio signal of one of audio formats arranged according to the preset priority among the plurality of audio signals.

In this situation, the plurality of audio signals received via a single channel are generated in a plurality of different languages and compressed in a plurality of different audio formats, and thus the broadcasting output apparatus 1000 needs to select a suitable language and a suitable audio format among the plurality of different languages and the plurality of different audio formats, respectively.

The selection unit 400 selects one or more audio signals generated in a preset language among the plurality of audio signals, and then determines an audio signal of an audio format with the highest priority among the selected audio signals to be a final audio signal.

Table 1 exemplary shows languages and audio formats of the plurality of audio signals received via a single channel. A process by which the selection unit 400 selects an audio signal is described in Table 1.

TABLE 1

| PID | Audio format | Language |
| --- | --- | --- |
| 0 | MPEG | French |
| 1 | AC3 | French |
| 2 | MPEG | English |
| 3 | AC3 | English |
| 4 | AC3+ | English |
| 5 | HE-AAC | English |

In Table 1, a broadcast signal received via a single channel contains six audio signals. Here, packet identifier (PID) Nos. 0 and 1 indicate audio signals in French, and PID Nos. 2 to 5 indicate audio signals in English.

The selection unit 400 selects one or more audio signals generated in a preset language among the plurality of audio signals. For example, if the language is set to English, the selection unit 400 may select audio signals identified by PID Nos. 2 to 5 from among the six audio signals.

The selection unit 400 then selects a single audio signal in an audio format with the highest priority from among the one or more audio signals that have been selected. For example, if the priority is given in the order of HE-ACC, AC3+, AC3 and MPEG formats, with HE-ACC being at the highest priority, the selection unit 400 may select an audio signal identified by PID No. 5 from among the audio signals identified by PID Nos. 2 to 5. Subsequently, the audio decoder 332 decodes the audio signal identified by PID No. 5.

However, if the audio decoder 332 is unable to decode the audio signal identified by PID No. 5, that is, unable to decode an HE-ACC format signal, the selection unit 400 may select an audio signal identified by PID No. 4 of an AC3+ format having a lower priority than the HE-ACC format.

The storage unit 500 stores the language set to be applied when outputting audio signals. The storage unit 500 also stores the priority for various audio formats, for example a priority given in the order of HE-ACC, AC3+, AC3 and MPEG formats.

The priority for various audio formats stored in the storage unit 500 may be set during manufacturing of the broadcasting output apparatus 1000, or may be set and changed by a user.

In an exemplary embodiment of the present invention, the priority is given in the order of HE-ACC, AC3+, AC3 and MPEG formats, because HE-ACC and AC3+ formats have a higher compression rate than the MPEG format and are capable of carrying a multi-channel such as a 5.1 channel or 6.1 channel, so as to provide a high quality sound.

The controller 600 controls the overall operations of the broadcasting output apparatus 1000. In more detail, the controller 600 controls signal input and output operations among the tuner 100, demodulator 200, A/V signal processor 300, selection unit 400 and storage unit 500 via a system bus.

If the tuner 100 receives the broadcast signal, the controller 600 controls the received broadcast signal to be processed sequentially by the demodulator 200, demultiplexer 310, video decoder 322, audio decoder 332, video output unit 324 and audio output unit 334.

The controller 600 reads information regarding the pre-stored language and priority from the storage unit 500, and sends the read information to the selection unit 400. Additionally, the controller 600 controls the audio decoder 332 to decode an audio signal selected from among the plurality of audio signals by the selection unit 400.

FIG. 2 exemplary illustrates a user interface for setting a language and a format of an audio signal provided by the broadcasting output apparatus 1000 of FIG. 1.

A default language and a default priority for a plurality of audio formats are stored in the broadcasting output apparatus 1000. However, a user may change the default language and the default priority.

The user interface of FIG. 2 enables the user to optionally set a language to be applied when outputting audio signals, and a priority for a plurality of audio formats. The user interface of FIG. 2 may comprise a language setting area A and a priority setting area B.

The language setting area A may comprise a selection box in the form of a combo box so that a user may select one of a plurality of languages. Additionally, the priority setting area B may comprise a plurality of selection boxes for each priority level in the form of combo boxes so that a user may set the priority for the plurality of audio formats.

As described above, the default language and the default priority may be used without any change, or the user may optionally set the default language and the default priority to be a desired language and a desired priority using the user interface shown in FIG. 2.

Figure 3:
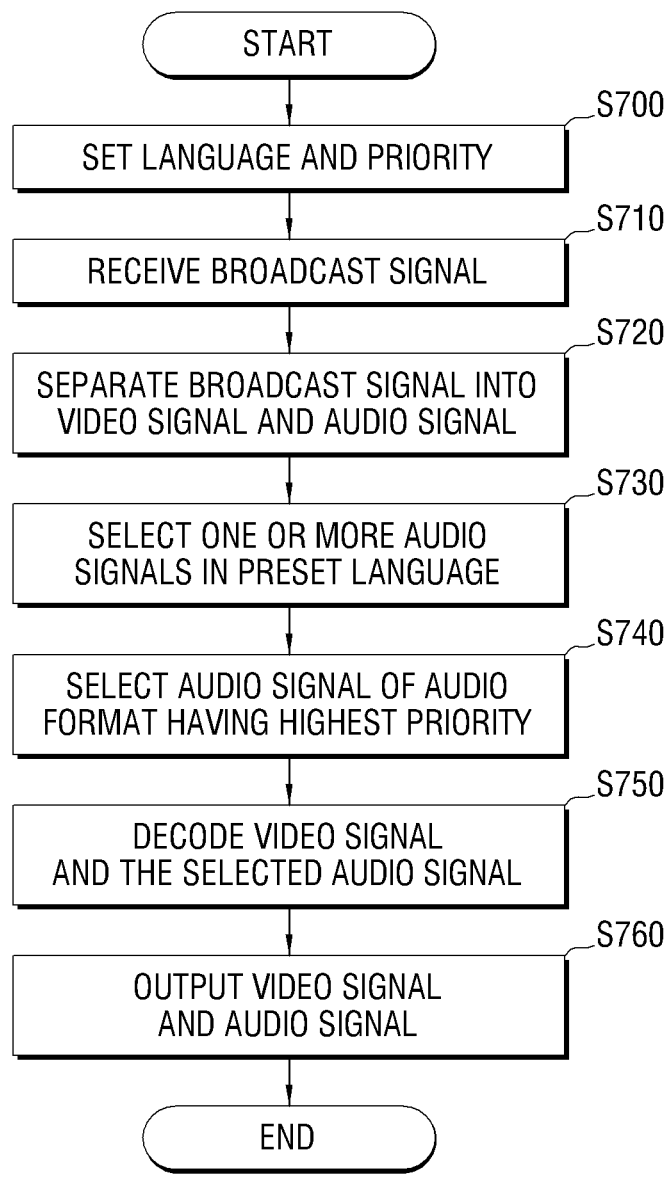
FIG. 3 is a flowchart explaining an audio signal processing method according to an exemplary embodiment of the present invention.

FIG. 3 is a flowchart explaining an audio signal processing method according to an exemplary embodiment of the present invention.

The audio signal processing method according to the exemplary embodiment of the present invention is now described with reference to FIGS. 1 and 3.

A language to be applied when outputting audio signals, and a priority for the plurality of audio formats are set, and the set language and priority are stored in the storage unit 500 (S700).

If the broadcasting output apparatus 1000 is powered on, the tuner 100 receives a broadcast signal from the broadcast transmitter, and the demodulator 200 then demodulates the received broadcast signal (S710).

The A/V signal processor 300 receives the demodulated broadcast signal, and then the demultiplexer 310 demultiplexes the broadcast signal and separates the demultiplexed broadcast signal into a video signal and an audio signal (S720).

The selection unit 400 selects audio signals in the preset language among the plurality of audio signals contained in the received broadcast signal (S730). In this situation, one or more audio signals may be in the preset language.

After operation S730, the selection unit 400 selects an audio signal in an audio format with the highest priority among the audio signals selected in operation S730 (S740).

After operation S740, the controller 600 controls the audio decoder 332 to decode the audio signal selected in operation S740. In more detail, the video decoder 322 decodes the video signal separated in operation S720, and the audio decoder 332 decodes the audio signal selected in operation S740 (S750).

Next, the video output unit 324 and the audio output unit 334 output a decoded video signal and a decoded audio signal, respectively (S760).

As described above, although the video signal of the broadcast signal received via a single channel is compressed in a single format, the audio signal of the broadcast signal is compressed in a plurality of audio formats. Accordingly, the broadcasting output apparatus 1000 may selectively decode the most suitable audio signal and output the decoded audio signal. Therefore, it is possible to provide a user with a sound with the highest quality using various audio formats capable of being provided by the broadcasting output apparatus 1000.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An audio signal processing method comprising:
    receiving a plurality of audio signals in which a same audio data content is compressed in different formats and is generated in different languages;
    selecting at least one first audio signal generated in a preset language from among the received plurality of the audio signals and selecting a second audio signal to be processed from among the selected at least one first audio signal according to previously set priorities for the different formats; and
    processing, by an audio signal processor, the selected second audio signal,
    wherein the selected second audio signal is an audio signal of one of the different formats arranged according to the previously set priorities among the received plurality of the audio signals, and
    wherein the previously set priorities are set in order of sound quality of the received plurality of the audio signals.

2. The audio signal processing method as claimed in claim 1, further comprising:
    setting the priorities for the different formats.

3. The audio signal processing method as claimed in claim 2, further comprising:
    outputting the processed second audio signal; and
    setting a language to be applied when outputting the processed second audio signal.

4. The audio signal processing method as claimed in claim 3, wherein the selecting selects the second audio signal of an audio format with a highest priority among the selected at least one first audio signal.

5. The audio signal processing method as claimed in claim 4, wherein the set language is one of different national languages, and the different formats include a Moving Picture Experts Group (MPEG) format, a Dolby digital (Ac3) format, a Dolby digital plus (Ac3+) formant, an advanced audio coding (AAC) format and a high efficiency (HE)-AAC format.

6. The audio signal processing method as claimed in claim 1, wherein the processing comprises:
    decoding the selected second audio signal; and
    outputting the decoded second audio signal.

7. The audio signal processing method as claimed in claim 1, further comprising:
    receiving a broadcast signal;
    separating the broadcast signal into a video signal and the plurality of the audio signals; and
    processing the separated video signal.

8. The audio signal processing method as claimed in claim 1, wherein the selected second audio signal is selected independently of a corresponding video signal.

9. The audio signal processing method as claimed in claim 1, wherein while the plurality of the audio signals in which the same audio data content is compressed in the different formats, a video signal corresponding the same audio data is compressed in only one type.

10. A broadcasting output apparatus comprising:
    a tuner which receives a broadcast signal including a video signal and a plurality of audio signals in which a same audio data content is compressed in different formats and is generated in different languages;
    a selection unit which selects at least one first audio signal generated in a preset language from among the received plurality of the audio signals and selects a second audio signal to be processed from among the selected at least one first audio signal according to previously set priorities for the different formats; and
    an audio processor which processes the selected second audio signal,
    wherein the selected second audio signal is an audio signal of one of the different formats arranged according to the previously set priorities among the received plurality of the audio signals, and
    wherein the previously set priorities are set in order of sound quality of the received plurality of the audio signals.

11. The broadcasting output apparatus as claimed in claim 10, further comprising:
    a storage unit which stores the priorities set for the different formats.

12. The broadcasting output apparatus as claimed in claim 11, wherein the storage unit further stores the preset language to be applied when outputting the processed second audio signal.

13. The broadcasting output apparatus as claimed in claim 12, wherein the selection unit selects the second audio signal of an audio format with a highest priority among the selected at least one first audio signals.

14. The broadcasting output apparatus as claimed in claim 13, wherein the preset language is one of different national languages, and the different formats include a Moving Picture Experts Group (MPEG) format, a Dolby digital (Ac3) format, a Dolby digital plus (Ac3+) formant, an advanced audio coding (AAC) format and a high efficiency (HE)-AAC format.

15. The broadcasting output apparatus as claimed in claim 13, further comprising a controller that provides a user interface in which a user sets the preset language and the set priorities for the different formats.

16. The broadcasting output apparatus as claimed in claim 10, wherein the audio processor comprises:
    an audio decoder which decodes the selected second audio signal; and
    an audio output unit which outputs the decoded second audio signal.

17. The broadcasting output apparatus as claimed in claim 10, further comprising:
    a demultiplexer which separates the received broadcast signal into a video signal and the plurality of the audio signals; and
    a video processor which processes the separated video signal.

18. A audio/video (A/V) signal processing apparatus comprising:
    a demultiplexer which receives and separates an input A/V signal into a video signal and a plurality of audio signals, each of the received plurality of the audio signals comprising a same audio data content and having a different combination of a language and an audio encoding format with respect to another audio signal of the received plurality of the audio signals;
    a selection unit that selects at least one first audio signal generated in a preset language from among the received plurality of the audio signals and selects a second audio signal from among the selected at least one first audio signal, according to previously set priorities for a plurality of audio encoding formats;
    a video processor which processes the video signal; and
    an audio processor which processes the selected second audio signal, wherein the selected second audio signal is an audio signal having an audio encoding format having a highest priority, according to the previously set priorities, from among the received plurality of the audio signals, and wherein the previously set priorities are set in order of sound quality of the received plurality of the audio signals.

19. The A/V signal processing apparatus of claim 18, further comprising:

a storage unit which stores information on the preset language and the plurality of the audio encoding formats with the corresponding priorities according to which the selection unit selects the second audio signal; and a controller which obtains the information on the preset language and the plurality of the audio encoding formats and sends the obtained information to the selection unit for the selection of the second audio signal, wherein the selected second audio signal is an audio signal having the preset language and the audio encoding format having the highest priority, according to the previously set priorities, from among the received plurality of the audio signals.

20. The A/V signal processing apparatus of claim 19, wherein the selected second audio signal is an audio signal having the preset language and an audio encoding format having a next priority, according to the previously set priorities, from among the received plurality of the audio signals if the audio signal having the preset language and the encoding format having the highest priority cannot be processed in the A/V signal processing apparatus.

21. The A/V signal processing apparatus of claim 20, wherein the controller provides a user interface in which a user sets the preset language and the corresponding priorities to the plurality of the audio encoding formats.

22. The A/V signal processing apparatus of claim 18, wherein the language is one of different national languages, and the audio encoding format having the highest priority is one of a Moving Picture Experts Group (MPEG) format, a Dolby digital (Ac3) format, a Dolby digital plus (Ac3+) formant, an advanced audio coding (AAC) format and a high efficiency (HE)-AAC format.

* * * * *